United States Patent

[11] 3,604,437

| [72] | Inventor | William T. Tappan, Jr.<br>Albuquerque, N. Mex. |
|---|---|---|
| [21] | Appl. No. | 827,734 |
| [22] | Filed | May 26, 1969 |
| [45] | Patented | Sept. 14, 1971 |
| [73] | Assignee | Tamonite, Inc.<br>Albuquerque, N. Mex. |

[54] PORTABLE AIR FILTER CLEANER
4 Claims, 4 Drawing Figs.

[52] U.S. Cl. .................................................. 134/102,
134/138, 134/167
[51] Int. Cl. .................................................... B08b 3/02,
B08b 5/02
[50] Field of Search ........................................ 134/102,
138, 139, 141, 167, 166

[56] References Cited
UNITED STATES PATENTS

| 2,194,607 | 3/1940 | McDevitt | 134/141 X |
| 1,261,778 | 4/1918 | Deming | 134/141 X |
| 2,432,290 | 12/1947 | Davis | 134/167 R |
| 2,919,704 | 1/1960 | Butler | 134/166 X |
| 3,216,429 | 11/1965 | Dick | 134/102 |
| 3,428,060 | 2/1969 | Spivey | 134/138 X |

*Primary Examiner*—Thomas F. Callaghan
*Assistant Examiner*—Philip C. Kannan
*Attorney*—James E. Snead ABSTRACT: The present invention relates to a portable air filter cleaner, and comprises a two or three stage washing and drying system, and process wherein alternatively air or liquid cleaning solvent may be sprayed onto the inside and outside of an air filter simultaneously while it is being rotated for dry cleaning or wet cleaning and air drying the filter. The system is constructed so as to be portable so that it may be moved from one place to another, occupying a minimum of space, and it may be connected into any convenient water and air outlet for ready use. The device is adaptable for use with any size air filter.

PATENTED SEP 14 1971
3,604,437
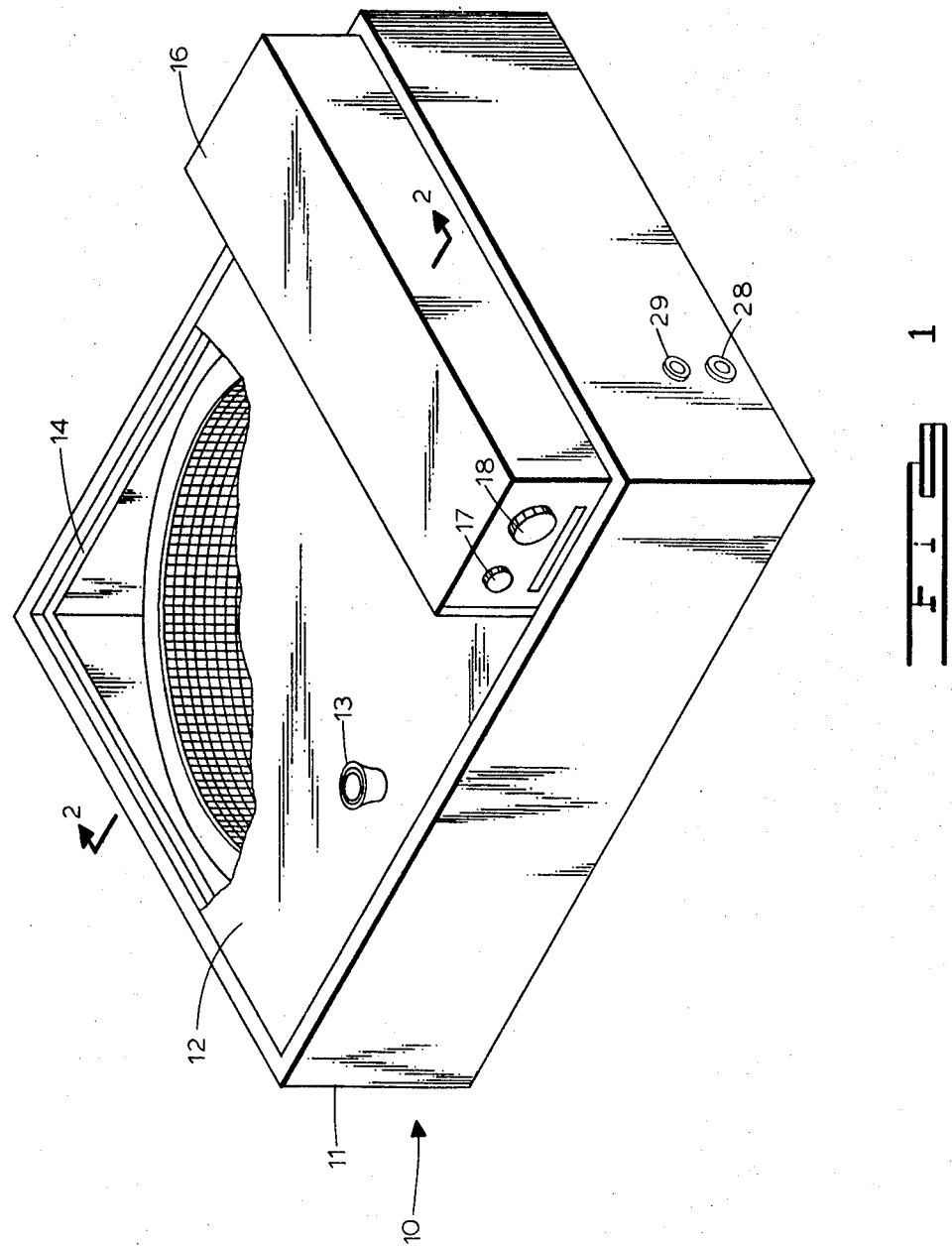
INVENTOR
WILLIAM T. TAPPAN JR.
BY
ATTORNEY

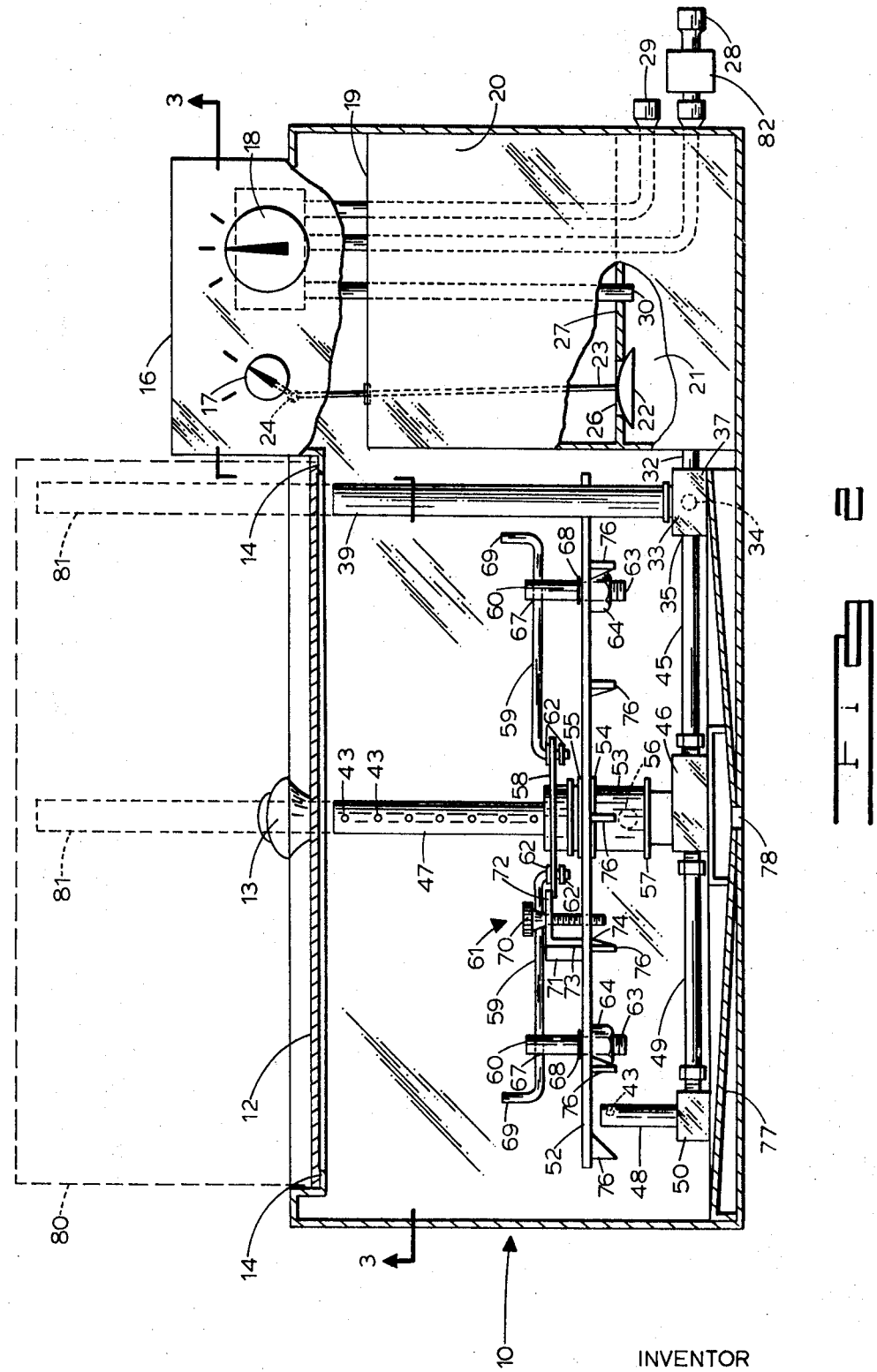

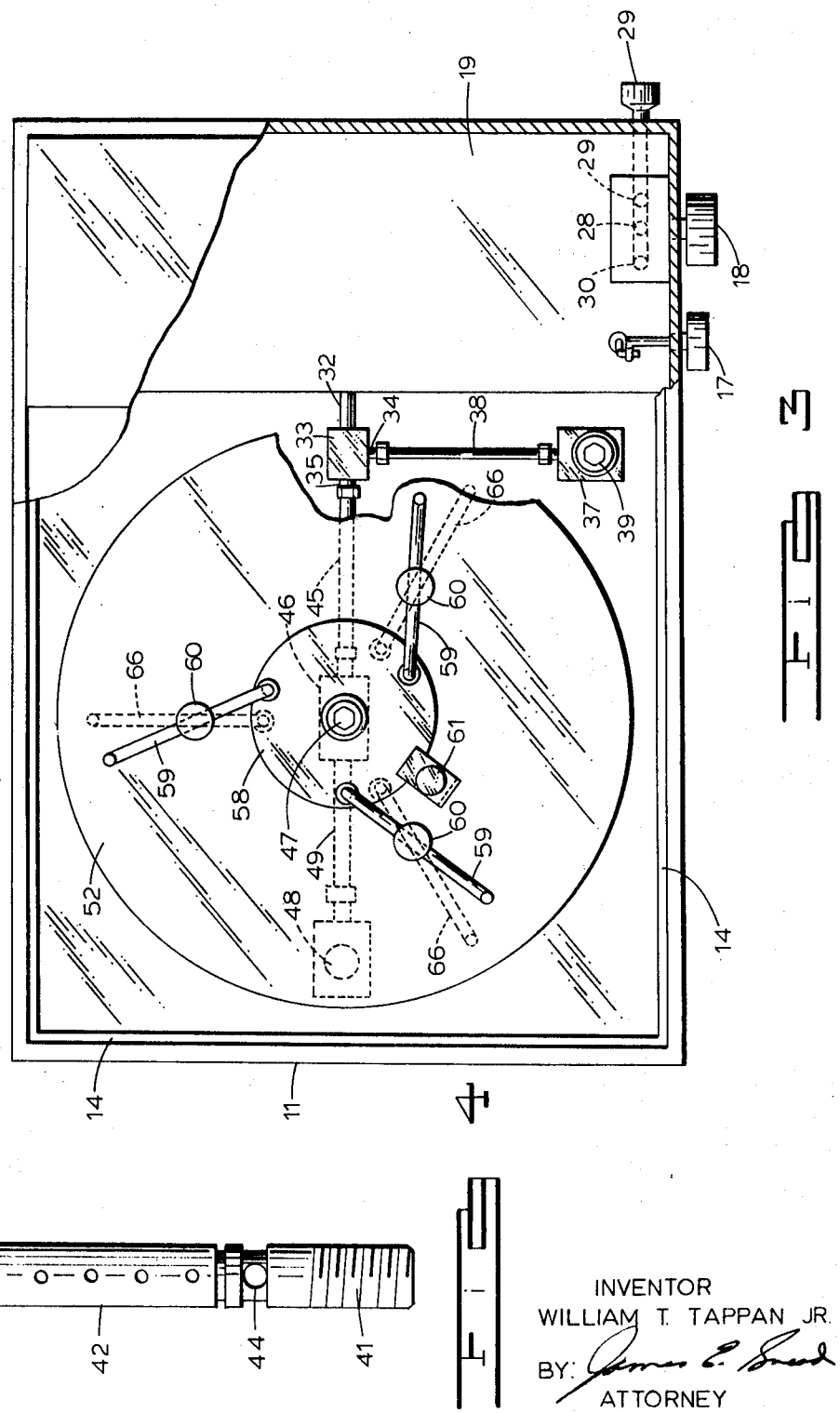

PORTABLE AIR FILTER CLEANER

There has been a long standing need for the development of an efficient air filter cleaner which is portable and adaptable for use with various types and sizes of air filters and which can be installed and moved from place to place with a minimum of inconvenience. This need is particularly acute in service station operations where often it is mandatory that an air filter be replaced or cleaned. No efficient, portable cleaners were available in the prior art until the present invention. Thus, automobiles are either operated with dirty air filters, which adversely affects their operation, or a new filter is installed, which is expensive. In situations where there are air filter cleaners available, they are complicated, expensive to manufacture and operate and difficult to maintain, and they cannot be conveniently moved from one place to another.

In the prior art, there are filter cleaners wherein solvent is sprayed into the filter during the cleaning process. These filters do not incorporate a drying cycle nor do they provide structure for automatically spinning the filter while it is being cleaned and dried so that the centrifugal force aids in the cleaning process and aids in the drying process by throwing the water from the filter. The prior art devices are normally incorporated directly into the system with the filter and are not portable and adaptable for moving from one place to another. None of the devices of the prior art comprise a system for selectively jetting air or liquid cleaning solvent onto the filter to provide a combined dry and wet cleaning process.

It is therefore an object of this invention to provide an air filter cleaner which is efficient, portable, simple to operate and convenient to move from one place to another.

It is a further object of this invention to provide a portable air filter cleaner which may be connected into the usual water and air compressor systems found in service stations and at other places without modification of the normal water and air compressor systems.

It is a further object of this invention to provide a portable air filter cleaner wherein the filter is caused to rotate rapidly during the cleaning and drying cycles so that centrifugal force aids in the cleaning process and in the drying process.

A further object of this invention is to provide a portable air filter cleaner wherein air or liquid solvent may be jetted onto the filter to provide a dry cleaning process or a wet cleaning and air drying process, or a combination dry and wet cleaning process.

A further object of this invention is to provide a portable air filter cleaner wherein the filter automatically rotates during the jetting operation.

In general, this invention comprises a small, compact, lightweight filter cleaner having a solvent reservoir and a mixing chamber which is supplied alternatively with water from a water system and with air from an air compressor to mix the detergent with water during the wet cycle and force it through spray nozzles onto the filter and at the same time cause rotation of the filter. During the dry cycle it forces air through the spray nozzles onto the filter while at the same time spinning it so that centrifugal force aids both in the cleaning and drying processed.

Other objects and advantages of this invention will become apparent as the same is better understood by reference to the specification and accompanying drawings wherein:

FIG. 1 is a partial cutaway isometric view of one embodiment of the air filter cleaner showing an air filter in cleaning position.

FIG. 2 is a partial cross-sectional view of the portable air filter cleaner, taken along lines 2—2 of FIG. 1.

FIG. 3 is a partial cross-sectional view of the top of one embodiment of the portable air filter cleaner, taken along lines 3—3 of FIG. 2.

FIG. 4 is a plan view of one embodiment of the spray nozzles which are a part of this invention.

Referring now to the drawings wherein like numerals represent like parts, it will be seen that the filter cleaner 10 comprises a housing 11 having a removable lid 12 with a nob 13 affixed thereto for lifting and lowering the lid. A lid seat 14 is formed in the housing 11 for positioning the lid 12 when the device is in operation. Lid 12 may be enlarged or modified as shown by the dotted line in FIG. 2 to be hereinafter more particularly described.

A superstructure 16 may be provided on housing 11 for supporting a solvent meter valve control lever 17 and a three-way valve 18 for controlling the air-water system, all of which is to be more particularly described.

A solvent tank 19 is affixed within housing 11 which solvent tank is divided into two sections, the first being a solvent reservoir 20, and the second being a mixing chamber 21, mixing chamber 21 communicates with solvent reservoir 20 through aperture 26. A solvent meter valve 22 is seated in aperture 26 and connected to solvent meter valve control lever 17 through valve stem 23 and valve linkage 24. A partition 27 separates solvent reservoir 20 and mixing chamber 21.

The air-water system which supplies the cleaning, drying and rotating force for filter cleaner 10 comprises an air intake 28, water intake 29 and a pressure pipe 30, all of which are operably connected to three-way valve 18, which may be switched to allow injection of air into mixing chamber 21 through air intake 28 or alternatively water into mixing chamber 21 through water intake 29, or it may be switched to the off position when the device is inoperable. While the three-way valve is not shown in detail, such valves are well known in the art, and any one of several suitable valves may be used. The air intake 28 and water intake 29 may be repositioned on housing 11 in any one of many suitable manners. The location shown is merely one embodiment of the invention.

Mixing chamber 21 communicates with the filter cleaning system through outlet connector 32 which is connected into first inverse flair "T" 33 to supply the contents of mixing chamber 21 thereto. Flair "T" 33 has a first outlet 34 and a second outlet 35. First outlet 34 communicates with first compression flair fitting 37 through first pressure connection 38.

First pressure connector 38 may be any suitable type of connection, the only requirement being that it be pressure and watertight. For example, three sections of pipe with one being threaded into flair "T" 33 and the second being threaded into first compression flair fitting 37 and being connected together by a third pipe joined to the first two by universal joints. The outlet of first compression flair fitting 37 feeds into first spray nozzle 39 which is more particularly shown at FIG. 4.

The spray nozzles, including first spray nozzle 39, consist of a tubular member being threaded at one end 41 and having a spray end 42. A multiplicity of jets 43 are provided in spray end 42, and an enlarged opening 44 provides an inlet for the air or liquid from mixing chamber 21 to enter first spray nozzle 39.

Second outlet 35 of first inverse flair "T" 33 is connected into second inverse flair "T" 46 through second pressure connector 45. Again, second pressure connector 45 can be constructed in any suitable manner so long as it is pressure and watertight. Second inverse flair "T" 46 feeds into second spray nozzle 47 and into actuator jet 48. The output from second inverse flair "T" 46 feeds into actuator jet 48 through third pressure connector 49 and second compression flair fitting 50. Actuator jet 48 is constructed in the same manner as first spray nozzle 39 with the exception that it has only one jet 43.

A filter turntable 52 is supported on a bearing 53 by means of snaprings 54 and 55 positioned on the under side and upper side of filter turntable 52 respectively. A jet port 56 is provided in second spray nozzle 47 for supplying either solvent or air between bearing 53 and nozzle 47 to supply lubrication and minimize friction for rotation of bearing 53 around nozzle 47.

A filter positioning mechanism is operably connected to turntable 52 for positioning and centering a filter on the turntable. The mechanism comprises a rotatable disc 58, positioning arms 59, sliding arm supports 60, and disc lock 61. Positioning arms 59 are removably secured to rotatable disc 58 by any suitable means, such as through apertures in disc 58 and snap rings 62 secured both above and below positioning arms 59 on either side of the aperture. Positioning arms 59 are supported by sliding arm supports 60 which have a threaded end 63 to which a nut 64 is secured beneath turntable 52. Sliding arm supports 60 extends through slots 66 in turntable 52. They are provided with holes 67 in their upper ends through which positioning arms 59 extend in a slidable arrangement. Positioning arms 59 and snaprings 68 retain sliding arm supports 60 through slots 66 in turntable 52.

As may be seen, positioning arms 59 are generally S-shaped in configuration so that they are provided with upper projecting portions 69 for engagement with the air filter.

Disc lock 61 consists of a thumb screw 70 and an "L" bracket 71. One leg 72 of "L" bracket 71 engages the edge of rotating disc 58, and the second leg 73 is fixedly attached to turntable 52. Tightening thumb screw 70 on disc lock 61 prevents rotation of disc 58 independent of turntable 52. The loosening of thumbscrew 70 allows independent rotation of centering disc 58 so that it may be rotated in either clockwise or counterclockwise direction to allow engagement of protrusions 69 of positioning arms 59 to thus center a filter when placed on turntable 52.

Propulsion fins 76 are provided on the bottom of turntable 52 alignment with actuating nozzle 48 in a position so that jet 43 of actuating nozzle 48 is aligned with the fins so that material sprayed from the nozzles engages the fins to cause rotation of turntable 52.

The function of actuating nozzle 48 can be supplied from jet 43 in spray nozzle 39 to supplement or replace actuating nozzle 48.

Housing 11 is provided with a concave bottom 77 having a drain 78 located thereon. The solution when falling to the bottom of housing 11 is conveyed to drain 78 and drained therethrough to any suitable container or to an attachment to a sewer line.

The operation of this invention is as follows:

Portable air filter cleaner 10 is positioned at a suitable location and air and water systems are connected into air and water intakes 28 and 29 respectively. An air pressure regulator 82 may be provided on air intake 28 to control and regulate the air pressure. Solvent meter valve control lever 17 is actuated to allow a desirable amount of solvent to pass from solvent reservoir 20 into mixing chamber 21. Three-way valve 18 is turned to connect water intake 29 into mixing chamber 21 through pressure pipe 30. The force of the water in mixing chamber 21 mixes the water and the solvent and the solution enters the cleaning system through outlet connector 32. The solution is conveyed to first spray nozzle 39 through first inverse flair "T" 33, pressure connector 38 and first compression flair fitting 37. The solution sprays through the multiplicity of jets 43 to a filter positioned on turntable 52 by positioning arms 69.

Simultaneously, the solution continues through outlet 35 in first inverse flair "T" 33 and pressure connector 45 to enter second inverse flair "T" 46 and is then conveyed into aperture 56 to lubricate bearing 53 to provide a friction free surface for rotation of bearing 53 and turntable 52. The solution is jetted from jets 43 in second spray nozzle 47 onto the interior of the air filter. In addition, the solution is conveyed from second inverse flair "T" 46 through third pressure connection 49 into second compression flair fitting 50 and thence into actuating nozzle 48. It is jetted from jet 43 in actuating nozzle 48 to engage the rotation fins 76 and cause spinning of turntable 52 and the filter positioned thereon.

The combined force on the jet spray and the centrifugal force of the spinning action force the cleaning solution to permeate the air filter and remove dirt therefrom. The first and second spray nozzles 39 and 47 respectively can be rotated to vary the angle that the solution strikes the filter in any desired way. The pressure of the solution is controlled simply by controlling the water pressure which enters mixing chamber 21.

After a predetermined cleaning period, three-way valve 18 may be moved to either stop the system or to shut off the water intake 28 and open air intake 29 to introduce air into mixing chamber 21 through pressure pipe 30. The air is then sprayed on the air filter being cleaned, and turntable 52 is caused to rotate, thus causing drying of the air filter by the centrifugal force and by the further drying effect of the air on the filter.

As is well known, air filters vary greatly in size, depending upon whether a passenger car is being used or a larger motor vehicle. Thus, the size of the cleaner can be varied simply by providing an enlarged hood 80 and elongated spray nozzles 81 which may be connected into the system. Enlarged hood 80 may be connected simply by removing lid 12 and placing hood 80 on the lid seat 14. Elongated spray nozzles 81 may be attached to the device simply by unscrewing first and second spray nozzles 39 and 47 respectively and adding nozzles 81. In the alternative, spray nozzles 39 and 47 may be provided at their top portions with a removable plug so that the plugs can be removed and elongations 81 can be screwed onto the top of the nozzles and extend their length.

Obviously, many modifications and changes of the above invention are possible within the light of the teachings of the application.

What is claimed is:

1. In a portable air filter cleaner, the combination comprising:

a housing;

a solvent tank within said housing, said solvent tank being divided into a solvent reservoir and a mixing chamber;

means for transferring a solvent from said solvent tank reservoir into said mixing chamber;

means for selectively introducing water or air into said mixing chamber to thereby either mix water with the solvent to form a cleaning solution in said mixing chamber or to force the mixed material from said mixing chamber;

outlet means operably connected to said mixing chamber for removing the contents thereof, said outlet means being operably connected at its other end to a spraying and an actuating system;

said spraying system comprising a plurality of spray nozzles operably connected to said outlet means, a portion of which are adapted to simultaneously spray cleaning solution or air onto the exterior and interior surfaces of an air filter within said housing;

a turntable means formed in a flat disc and rotatably secured within said housing by means of a shaft and bearing for supporting an air filter within said housing, said turntable including positioning means for positioning an air filter thereon;

said bearing having a first and second end with said turntable removably positioned in the midportion of said bearing, said bearing surrounding said shaft with an annular space between the two members;

at least one jet port within said shaft being operably connected to said output means on said mixing chamber whereby fluid may be jetted from said mixing chamber through said jet port into the annular space between the said shaft and bearing to provide lubrication for said bearing;

protrusion means fixedly connected to and extending downwardly from said turntable for receiving actuating fluid from an actuating system;

said actuating system comprising at least one actuating nozzle operably connected to said outlet means from said mixing chamber and having at least one spray nozzle located therein for exhausting fluid from said mixing chamber onto said protrusion means to thereby cause rotation of said turntable;

whereby, an air filter may be positioned on said turntable within said housing and alternatively cleaning solvent or air jetted onto the interior and the exterior surfaces of the said air filter while said air filter is caused to rotate so that said filter may be wet cleaned, dry cleaned, or wet cleaned and dried.

2. The invention as defined in claim 1 wherein said filter positioning means comprising:

a rotatable disc rotatably secured to the second end of said bearing;

a plurality of positioning arms having a first and a second end with the first end being rotatably secured to the periphery of said rotatable disc and the second end extending outwardly therefrom;

sliding arm supports having a first and a second end, said first end being slidably connected to said turntable means and said second end being slidably connected to said positioning arms; and disc locking means connected between said rotatable disc and turntable to lock said disc against rotation with respect to said turntable;

whereby said filter-positioning means may be actuated to position and retain an air filter on said turntable.

3. The invention as described in claim 2 wherein:

said protrusion means comprises a multiplicity of fins positioned on the turntable's underside adjacent the periphery thereof.

4. The invention as described in claim 3 wherein:

said disc lock means comprises a thumbscrew and an "L" bracket;

said "L" bracket having one leg adapted to frictionally engage the upper surface of said rotatable disc with the other leg forming a right angle with the first leg and adapted to engage said turntable;

said thumbscrew extending through that leg of said "L" bracket which is adapted to engage said rotatable disc and to screw into said turntable;

whereby the frictional engagement of that leg of said "L" bracket adapted to engage the upper surface of said rotatable disc may be varied to allow rotation of said rotatable disc with respect to said turntable or alternatively to prevent such rotation.